United States Patent

Osajima et al.

[11] 3,944,639
[45] Mar. 16, 1976

[54] PROCESS FOR CONTINUOUSLY PRODUCING COMPOSITE POROUS FLAKES

[75] Inventors: Yoshihiro Osajima; Syoji Imao; Tokuo Shinomiya; Sirou Mihara, all of Otake; Michisuke Edamatsu, Yamaguchi, all of Japan

[73] Assignee: Mitsubishi Rayon Co., Ltd., Tokyo, Japan

[22] Filed: Dec. 26, 1973

[21] Appl. No.: 427,843

[30] Foreign Application Priority Data
Dec. 29, 1972 Japan.................. 47-1568

[52] U.S. Cl............................ 264/13; 264/101
[51] Int. Cl.²........................... B01J 2/02
[58] Field of Search............. 264/6, 7, 13, 101

[56] References Cited
UNITED STATES PATENTS

| | | | |
|---|---|---|---|
| 3,561,003 | 2/1971 | Lanham et al. | 264/13 |
| 3,799,235 | 3/1974 | Moosavian et al. | 264/13 |

OTHER PUBLICATIONS

Chemical Engineers' Handbook, 4th Ed., 1963, pp. 20-57 to 20-60, McGraw-Hill Co., New York.

*Primary Examiner*—Robert F. White
*Assistant Examiner*—J. R. Hall
*Attorney, Agent, or Firm*—Armstrong, Nikaido & Wegner

[57] ABSTRACT

A process is disclosed whereby porous flakes usable for making paper-like sheets are produced by melting a 10 to 75 parts by weight of thermoplastic polymer, dispersing 25 to 90 parts by weight of finely divided inorganic particles in a solvent capable of dissolving the polymer in an amount of 80 to 95% based on a total weight of the polymer, the inorganic particles and the solvent, at room temperature or lower to prepare a slurry. At a temperature at which the polymer can be dissolved in the solvent, the polymer melt is mixed with the slurry which has been preliminarily heated to a temperature pertinent for realizing the above-mentioned dissolving temperature when the heated slurry is mixed with the polymer melt, to prepare a uniform dispersion of the inorganic particles in the polymer solution in the solvent and then, the dispersion is spurted from a closed tank through an orifice, into a zone having a temperature and pressure lower than that of the dispersion, whereby the spurted dispersion is converted to composite porous flakes by rapidly evaporating the solvent.

9 Claims, 1 Drawing Figure

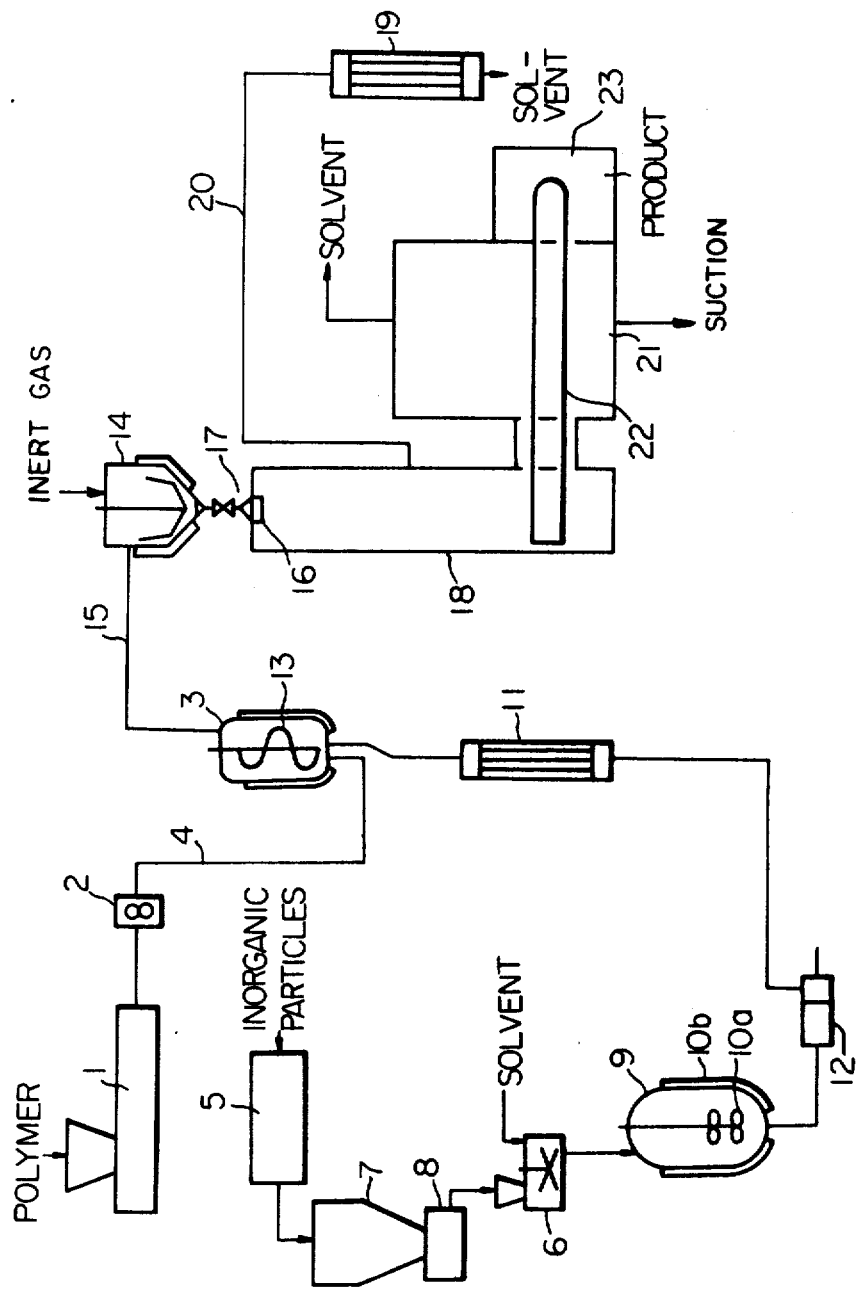

PROCESS FOR CONTINUOUSLY PRODUCING COMPOSITE POROUS FLAKES

The present invention relates to a process for continuously producing composite porous flakes, more particularly, relates to a process for continuously producing composite porous flakes consisting of a thermoplastic polymer and finely divided inorganic particles dispersed in the polymer, and being capable of effectively utilizing the physical and chemical properties of the inorganic particles. Such porous flakes are useful for producing paper-like sheets.

It is known that finely divided inorganic particles, for example, asbestos, alumina, barite and calcium carbonate have beneficial properties such as great resistance to thermal deformation, high rigidity, and high surface activity. These beneficial properties are inherent in inorganic substances but insufficient in organic substances. Accordingly, in order to improve the insufficient properties of the organic substances, particularly, thermoplastic polymer materials, inorganic substances are combined with the thermoplastic polymer material.

For example, a sheet composed of a thermoplastic polymer and finely divided inorganic particles is produced by kneading a major amount of inorganic particles with a minor amount of thermoplastic polymer at a temperature higher than the softening point of the polymer and pressing the kneaded mixture through a pair of pressing rollers. The above process has the following disadvantages. That is, it is difficult to uniformly disperse the inorganic particles in the polymer. Further, it is hard to form the kneaded mixture into a uniform thin sheet of a thickness of 100 $\mu$ or less.

In order to eliminate the above difficulties, it is advantageous to form the sheet from finely divided flakes by the same method used for paper-making. In this case, the inorganic particles dispersed in the flakes are effective for the increase of the specific gravity of the flakes. The relatively large specific gravity of the flakes serves to form the sheet easily from the flakes suspended in water in the paper-making method.

A process for producing batchwise, polymeric porous flakes consisting of a thermoplastic polymer and finely divided inorganic particles dispersed in the polymer has been provided. In this process, a mixture of the finely divided inorganic particles, the thermoplastic polymer and a solvent capable of dissolving the polymer, having a boiling point lower than the softening point of the polymer, is charged into a closed vessel such as an autoclave and heated at a temperature at which the polymer is completely dissolved in the solvent, the inorganic particles are uniformly dispersed in the solution, and the solvent is vaporized to generate an autogenous pressure of at least 5 kg/cm², preferably, 10 kg/cm². The dispersion thus prepared is spurted into a zone having a pressure lower than that of the dispersion, for example, normal atmosphere, under a pressure equal to or higher than the autogenous pressure. When spurted, the dispersion is finely divided, the solvent is very rapidly vaporized and therefore, the dispersion is converted to finely divided porous flakes. However, when the above-mentioned batch process is carried out on an industrial scale, the following disadvantages are evident.

1. The use of a large capacity, high pressure vessel is economically disadvantageous.

2. The quality and shape of the porous flakes differ between the initial and final dispersion, spurted from the vessel.

3. Some of the dispersion is retained in the vessel even after spurting is completed.

4. In the case where a plurality of high pressure vessels in parallel arrangement are successively used, a large area for the arrangement is required.

5. The successive use of numerous high pressure vessels causes complexity in operation.

A process for producing continuous strands from a solution of a thermoplastic polymer in a solvent for the polymer containing no inorganic particles is known. In this process, the solution passes through a zone where the pressure of the solution is lowered and is then extruded through an orifice into the atmosphere. That is, by the use of the pressure-lowering zone, the solution can be extruded in the form of a continuous strand. However, this process cannot provide finely divided porous flakes from the solution.

It has been recognized that in order to continuously produce the porous flakes on an industrial scale, it is necessary to dissolve the thermoplastic polymer in the solvent in as little time as possible. Additionally, in order to produce porous flakes of uniform quality it is important that the inorganic particles be uniformly dispersed in the polymer solution having a relatively high viscosity.

An object of the present invention is to provide a process for continuously producing composite porous flakes of uniform quality.

The other object of the present invention is to provide a process for continuously producing composite porous flakes, including dissolving a thermoplastic polymer in an organic solvent in a short time, and uniformly dispersing finely divided inorganic particles in the solution.

The above-mentioned objects can be accomplished by the process of the present invention. The process of the present invention comprises the steps of preparing a high temperature dispersion of 25 to 90 parts by weight of finely divided inorganic particles in a solution of 10 to 75 parts by weight of a thermoplastic polymer in a solvent in an amount of 80 to 95% based on the total weight of the inorganic particles, the polymer and the solvent, and spurting said dispersion under a pressure at least equal to the autogenous pressure of said solvent, through at least one orifice into a zone of a pressure and temperature less than that of said dispersion, thereby rapidly evaporating the solvent and forming composite porous flakes, and includes the improvement for continuously effecting the above steps, comprising melting the thermoplastic polymer, dispersing the finely divided inorganic particles in the organic solvent at room temperature or lower to prepare a slurry, mixing, at a temperature which the polymer can be dissolved in the solvent, the polymer melt with the slurry which has been preliminarily heated to a temperature pertinent for realizing the dissolving temperature when the heated slurry is mixed with the polymer melt, thereby preparing a uniform dispersion of the inorganic particles in the polymer solution, and then subjecting the dispersion to spurting.

The above process of the present invention was invented on the basis of the discovery that the dispersion can be prepared in a very short time by mixing a polymer melt with a slurry of finely divided inorganic particles in a solvent capable of dissolving the polymer, the slurry having been preliminarily heated to a temperature pertinent for realizing the dissolving temperature when the heated slurry is mixed with the polymer melt, that the slurry can be smoothly and safely transported when the slurry is at room temperature or lower, and that the above operations can be effected by simple equipment.

The inventors have studied the composition of the thermoplastic polymer and the inorganic particles. As a result of their study, it has been found that in order to efficiently utilize the beneficial properties of the inorganic particles, the composition has a structure wherein the inorganic particles are, as an aggregate material, uniformly distributed in a matrix of the thermoplastic polymer. Further, it has been found that in order to obtain the above-mentioned composite structure, the inorganic particles should be present in the composite structure in an amount satisfying the following relationship:

$$1 - W_{pmin} \geq W_f \geq W_{fc} \qquad (1)$$

wherein $W_f$ is a weight fraction of the finely divided inorganic particles in the desired composite structure, $W_{fc}$ is a weight fraction of the inorganic particles in a speculated composite structure wherein the inorganic particles are compacted under a pressure of 10 kg/cm² and the thermoplastic polymer completely fills voids formed among the inorganic particles, and $W_{pmin}$ is a minimum weight fraction of the thermoplastic polymer required to form a composite structure having mechanical properties sufficient for practical use. Generally, it is desirable that the $W_{pmin}$ is at least 0.1.

The $W_{fc}$ is referred to as a critical weight fraction of the inorganic particles and is found in the following relationship:

$$W_{fc} = V_p/(V_p + V_a - V_f) \qquad (2)$$

wherein $V_p$ is the specific volume of the polymer, $V_f$ is the true specific volume of the inorganic particles and $V_a$ is the bulkiness (apparent specific volume) of the inorganic particles.

The value of $W_{fc}$ ranges from approximately 0.3 to approximately 0.8 in response to the kinds of inorganic particles and the polymer to be combined therewith. Accordingly, it should be noted that the value of $W_f$ is between approximately 0.9 and approximately 0.25. This value of $W_f$ is considerably larger than the value which has been generally assumed for $W_f$. In other words, it was believed that the composite structure containing the inorganic particles in as large an amount as stated above was, in practice, very difficult to produce. However, according to the process of the present invention, the composite flakes can be formed from 25 to 90 parts by weight of the inorganic particles and 10 to 75 parts by weight of the thermoplastic polymer.

The finely divided inorganic particles usable for the process of the present invention are capable of passing through a 100 mesh screen of Japanese Industrial Standard and have a maximum size of 500 μ. Illustrations of such inorganic particles include, for example, asbestos, alumina, antimony trioxide, barite, calcium carbonate, calcium sulfate, kaolin clay, carbon black, diatomaceous earth, feldspar powder, terra abla, quartz, graphite, magnesium carbonate, magnesium hydroxide, magnesium oxide, mica, molybdenum disulfide, agalmatolite clay, sericite, pyrogenic silica, finely divided silicic acid, silica amorphous, silica sand, silicate, titanium oxide, whiting, slate powder and mixtures of two or more of the above-mentioned inorganic particles.

The thermoplastic polymers usable for the process of the present invention are synthetic thermoplastic polymers which may include stabilizers, antistatics, flame retardants and other conventional additives, if necessary.

The thermoplastic polymer may be selected from, for example, polyolefins, such as polyethylenes, polypropylene, polybutene-1, polystyrene and polyisobutylene; polyamides such as polyhexamethyiene sebacamide, polycaprolactam and polypyrrolydone; polyesters, such as polyethylene terephthalate, poly($\beta$-valerolactone), and poly[p-($\beta$-oxyethoxy) benzoate]; polycarbonates, polyurethanes, polyethers such as polyoxymethylene and poly[p-(2,6-dimethylphenoxide)]; homopolymers and copolymers of vinyl compounds, such as acrylonitrile, vinyl chloride, vinyl acetate, vinylidene chloride, and methyl methacrylate, a copolymer of vinylidene chloride, and methyl methacrylate; a copolymer of vinyl alcohol and ethylene obtained by hydrolysis of a copolymer of vinyl acetate and ethylene, and mixtures of two or more of the above-mentioned polymers.

Solvents which may be employed for the process of the present invention should have a boiling point lower than the softening point of the employed polymer and should be capable of dissolving the polymer under the dispersionpreparing conditions. They should be substantially inert to the polymer and materials from which the employed equipments are composed.

Illustrative of suitable solvents, one can mention, for example, hydrocarbons such as butane, hexane, cyclohexane, pentene, benzene and toluene; halogenated hydrocarbons such as methylene chloride, chloroform, methyl chloride, propyl chloride, trichloroethylene, trichloroethane, tetrachloroethylene, tetrachloroethane and chlorobenzenes; alcohols such as methanol, ethanol, propanol and butanol; ketones such as acetone, cyclopentanone, methyl ethyl ketone and hexafluoroacetone; esters such as methyl acetate, ethyl acetate and γ-butyrolactane; ethers such as ethyl ether, tetrahydrofurane and dioxane; nitriles such as acetonitrile and propionitrile; trifluoroacetic acid, carbon tetrachloride, carbon disulfide, nitromethane, water, sulfur dioxide and a combination thereof. Depending on the nature of the particular polymer, a suitable solvent should be appropriately selected.

The present invention is illustrated by the accompanying drawing which is a flow sheet showing an embodiment of the process of the present invention.

Referring to the accompanying drawing, a thermoplastic polymer is fed into an extruder 1 wherein the polymer is melted at a temperature higher than the melting point of the polymer. The polymer melt is extruded at a predetermined flow rate. In order to accurately adjust the flow rate of the polymer melt, a gear pump 2 may be connected to the outlet of the extruder 1. By using the gear pump 2, the polymer melt is accurately delivered at a predetermined rate. The polymer melt is supplied to a dissolving vessel 3 through a supply conduit 4.

In the preparation of the slurry, the finely divided inorganic particles are dispersed in an organic solvent capable of dissolving the thermoplastic polymer in a predetermined proportion.

In this preparation, if the inorganic particles are hygroscopic, their weights will vary in response to the absorption of water. If the inorganic particles with absorbed water are weighed and mixed with the solvent, the composition by weight of the inorganic particles and the solvent varies in response to the amount of water absorbed in the inorganic particles. The variation in the proportion exceeding a permissible upper limit results in nonuniformity in the quality of the product. Sometimes, the solvent must be protected from the addition of water, and in such cases to completely remove water from the inorganic particles or to control the content of water in the inorganic particles within predetermined limits, the inorganic particles absorbing moisture must be dried in a dryer 5.

The dried inorganic particles are fed at a predetermined rate into a mixer 6 through a hopper 7 and a constant flow feeder 8.

The solvent is fed at a predetermined rate into the mixer 6 and uniformly mixed with the inorganic particles to prepare a slurry wherein the inorganic particles are uniformly suspended. The slurry thus prepared is stored in a slurry tank 9 with a stirrer 10a which is used to prevent depositing of the inorganic particles.

Further, the slurry tank 9 has a cooling jacket 10b through which a cooling medium is circulated to maintain the slurry at a predetermined temperature. This is effective for preventing the evaporation of the solvent and maintaining the density of the slurry. The slurry is fed into the dissolving vessel 3 through a slurry heater 11 by means of a fixed delivery pump 12. The fixed delivery pump 12 serves to feed the slurry to the vessel 3 at a constant flow rate. The pump 12 may be selected from plunger pumps, gear pumps and preferably, diaphragm pumps. While passing through the slurry heater 11, the slurry is raised to a desired temperature at which the thermoplastic polymer to be mixed with the slurry is dissolved in the solvent. The heater 11 may be selected in response to the kind and viscosity of the slurry from heat-exchangers having numerous heating pipes and, preferably, heat-exchangers having an internal heating surface on which the material is heated and the heated material is collected by a shovelling means. The heating pipe type heat-exchanger is usable for the slurry having a relatively low viscosity. The internal heating surface type heat-exchanger is usable for the slurry having a relatively high viscosity.

The heated slurry is mixed, in the dissolving vessel 3, with the thermoplastic polymer melt. While travelling through the dissolving vessel 3, the polymer melt is dissolved in the solvent and the inorganic particles are uniformly dispersed in the solution.

In order to produce uniform polymeric flakes, it is necessary that the dissolving of the polymer melt is completed by the time at which the mixture arrives at the outlet of the vessel 3. For this purpose, a plurality of dissolving vessels through which the slurry naturally flows may be arranged in series. Also, the dissolving vessel is of a piston flow type which is effective for making the residence time of the slurry in the vessel uniform.

Further, in order to complete the dissolving of the polymer within as short a time as possible, it is effective that shearing actions be imparted to the mixture so that fresh intersurfaces are formed between the polymer melt and the solvent. This is because the polymer melt is dissolved at the fresh intersurfaces. Therefore, it is preferable that the dissolving vessel is provided with a stirrer 13. A static mixer, screw mixer or line mixer may be located at the inlet of the dissolving vessel 3. The mixers serve to shear and disperse the mixture of the polymer melt, which is supplied in the form of strand, and the slurry. Such shearing and dispersing are effective for making the surface area of the polymer melt larger and preventing the entanglement of the polymer melt on the shaft portion of the stirrer. The dispersion prepared in the vessel 3 is forwarded into a head tank 14 through a conduit 15.

The shape of the polymer flakes which are produced by spurting the dispersion through orifices 16, depends on the shape and size of the orifice and, mainly, the composition of the dispersion to be spurted, dispersing property of the inorganic particles, and temperature and pressure of the dispersion. Accordingly, in order to maintain the dispersion at a constant composition and uniformly disperse the inorganic particles, it is preferable that the dispersion is stirred in the head tank 14 so that the head tank 14 serves as a buffer tank. Further, it is necessary that the dispersion is accurately maintained at a predetermined temperature with a variation of ±5°C, preferably ±1°C. The dispersion is sometimes required to have a pressure higher than the autogenous pressure of the solvent. In this case, the head tank 14 has an upper space formed above the dispersion, and the space is pressurized by an inert gas, for example, nitrogen. If the level of the dispersion in the head tank 14 varies, it is necessary that the pressure in the upper space is maintained constant by means of a pressure control device (not shown).

In order to produce discontinuous flakes of the polymer composition, it is important that the orifices 16 are located at a position as close as possible to the outlet of the head tank 14. If the pressure of the dispersion is lowered between the head tank 14 and the orifices 16, sometimes the extruded dispersion merely forms a continuous strand. In the apparatus shown in the accompanying drawing, a valve 17 is located between the head tank 14 and the orifices 16 in order to close the head tank 14 when the orifice is clogged. The valve 17 is required to have as little as possilbe resistance to the flow of the dispersion. The dispersion is spurted, in the form of finely divided particles, into a spurt chamber 18 having a normal pressure. In the spurt chamber 18, the solvent is rapidly evaporated from the finely divided particles of the dispersion so as to form finely separated flakes consisting of the polymer and the inorganic particles uniformly dispersed in the polymer. Sometimes, a portion of the solvent remains in the resultant flakes. The amount of the solvent remaining in the flakes is thermodynamically dependent on the composition, concentration, temperature, etc., of the dispersion in the head tank 14.

The vaporized solvent in the spurt chamber 18 flows into the condenser 19 through a conduit 20, and is condensed therein so as to be recovered. The solvent remaining in the flakes is evaporated in a dryer 21 and recovered.

The resultant flakes fall down onto a permeable sheet, for example, a net conveyer 22 circulating through the spurt chamber 18, the dryer 21 and a collecting chamber 23. The flakes are collected in the collecting chamber 23. A suction box (not shown) may be located under a portion of the conveyer 22 onto which the flakes fall. By sucking air through the permeable sheet, the flakes are deposited on the sheet in a uniform thickness and prevented from scattering. The uniformity in the thickness of the flakes is important for uniformly drying the flakes in the dryer chamber 21.

A pair of nipping rollers (not shown) may be disposed so as to sandwich a portion of the conveyer 22 in the dryer 21 or the collecting chamber 23. By being pressed by the nipping rollers, the flakes on the conveyer 22 are directly formed into a sheet. Since the conveyer 22 circulates through the spurt chamber 18 and the dryer 21, it is difficult to completely seal and spurt chamber 18. However, in order to prevent the flow of the hot air from the dryer into the spurt chamber 18 and the counter flow of the solvent vapor, it is desirable that the spurt chamber 18 be sealed as hermetically as possible.

In accordance with the other aspect of the process of the present invention, a minor portion of the inorganic particles to be contained in the composition may be blended with the polymer melt in the extruder. If the amount of the inorganic particles to be blended with the polymer melt is too large, it causes a difficulty in the extrudion of the blend. this difficulty is basically caused by the creation of slip of the inorganic particles on the screw in the extruder. The slip results in a decrease of output of the blend and variation in blending ratio of the inorganic particles and the polymer melt. Accordingly, it is desirable that the portion of the inorganic particles to be blended with the polymer melt be in an amount of from 5 to 30%, based on the weight of the polymer melt.

The following example illustrates the present invention.

EXAMPLE 1

Referring to the accompanying drawing, an extruder 1 having an inside diameter of 50 mm and a ratio of the inside diameter to length, of 20, and a gear pump 2 connected to the extruder were used. A high density polyethylene having a melting point of 132°C, a true specific volume ($V_p$) of 1.05 cc/g and a melt index (MI) of 0.3 was fed into the extruder 1, and melted at a temperature of 200°C. The polyethylene melt was extruded at a flow rate of 16.7 kg/hr into a dissolving vessel 3 through the gear pump 2 and a conduit 4.

Finely divided silicic acid particles having an average size of 20 m$\mu$, a true specific volume ($V_f$) of 0.50 cc/g and an apparent specific volume ($V_a$) of 1.91 cc/g were dried in a dryer 5 at a temperature of 200°C for 5 hours. The dried silicic acid particles were received in a hopper 7 and then, fed into the mixer 6 at a feed rate of 25 kg/hr by a constant flow feeder 8.

An organic solvent, methylene chloride was fed into the mixer 6 at a flow rate of 395 kg/hr to prepare a slurry wherein the silicic acid particles were uniformly dispersed in methylene chloride. The slurry was received in a slurry tank 9, and maintained at a temperature of 10°C by circulating a cooling medium through a cooling jacket 10b while stirring the slurry with a stirrer 10a. At this time, the slurry had a velocity of approximately 1750 cp which was measured using a B-type viscometer.

The slurry was discharged from the slurry tank 9 by a diaphragm type constant flow pump 12 at a flow rate of 420 kg/hr into the dissolving vessel 3 through a heater 11 having numerous heating pipes. While flowing through the heater 11, the slurry was raised to a temperature of 167°C. The heated slurry was charged into the dissolving vessel 3 and mixed with the polyethylene melt which had been charged from the extruder 1. The dissolving vessel had a capacity of 70 liters and the mixture was stirred with helical paddles rotating at a velocity of 100 r.p.m. The mixture stayed in the dissolving vessel 3 for approximately 10 minutes while the polyethylene melt was completely dissolved in methylene chloride and the silicic acid particles were uniformly dispersed in the solution. The dispersion thus prepared was fed into a head tank 14 through a conduit 15. The temperature of the mixture in the dissolving vessel 3 and the dispersion in the head tank 14 was controlled at a temperature of 170°C.

The dispersion in the head tank 14 was pressurized with a high pressure nitrogen gas at a pressure of 40 kg/cm$^2$ gauge. The dispersion was spurted into a spurt chamber 18 through two orifices having a ratio L/D of 1.0, wherein L represents the length of the orifice and D the inside diameter thereof.

When the dispersion was spurted, the solvent in the dispersion was very rapidly vaporized and the remaining polyethylene and the silicic acid dispersing in the polyethylene formed finely divided porous flakes having numerous very fine pores therein. The vaporized methylene chloride was sucked from the spurt chamber 18 through a conduit 20 and condensed in a condenser 19. The condensed methylene chloride was recovered at a rate of approximately 280 kg/hr. The recovered solvent had a very high purity. The above prepared flakes contained approximately 280 kg per kg of flakes, of methylene chloride. The solvent was evaporated in a dryer 21 wherein the flakes were heated at a temperature of 60°C. The evaporated solvent was removed from the dryer 21 and recovered by way of absorption on activated carbon.

What we claim is:

1. In a process for producing composite porous flakes by spray drying, the improvement which comprises the steps of continuously:
   a. forming a polymer melt containing 10 to 75 parts by weight of a thermoplastic polymer,
   b. forming a first uniformly dispersed slurry containing 25 to 90 parts of inorganic particles dispersed in an organic solvent for the polymer, said solvent having a boiling point lower than the softening point of the polymer and said particles having a maximum size of 500 $\mu$,
   c. prior to mixing the slurry and polymer together, heating said slurry to an elevated temperature, sufficiently high to dissolve the polymer when added,
   d. mixing the polymer melt and the heated slurry to form a resulting second uniformly dispersed slurry containing completely dissolved polymer, inorganic particles and organic solvent, and maintaining said second slurry at a predetermined temperature within a variation of ± 5°C,
   e. spurting the second slurry as finely dispersed particles into an evaporation zone whereby the solvent is evaporated from the particles to form finely divided, separate flakes, said flakes comprising the polymer having uniformly dispersed therein the inorganic particles and
   f. recovering the resulting product as porous flakes.

2. A process as claimed in claim 1, wherein said spurting is effected by pressurizing said dispersion with a pressurized gas inert to said materials.

3. A process as claimed in claim 1, wherein said evaporated solvent from said dispersion is condensed and recovered.

4. A process as claimed in claim 1, wherein said porous flakes are dried to remove the solvent remaining therein.

5. A process as claimed in claim 1, wherein said porous flakes are collected on a permeable sheet by suction therethrough while being prevented from scattering.

6. A process as claimed in claim 1, wherein said melting of said polymer is effected in a screw type extruder.

7. A process as claimed in claim 1, wherein said polymer melt is fed into said mixing step in a predetermined flow rate by using a gear pump.

8. A process as claimed in claim 1, wherein said slurry is fed into said mixing step in a predetermined flow rate by using a constant flow pump.

9. A process as claimed in claim 1, wherein 5 - 30% by weight of said inorganic particles contained in said dispersion are preliminarily dispersed in said polymer melt and the balance of said inorganic particles are dispersed in said solvent.

* * * * *